US010895726B2

(12) United States Patent
Zou et al.

(10) Patent No.: US 10,895,726 B2
(45) Date of Patent: *Jan. 19, 2021

(54) TWO-DIMENSIONAL AND THREE-DIMENSIONAL FIXED Z SCANNING

(71) Applicant: Leica Biosystems Imaging, Inc., Vista, CA (US)

(72) Inventors: Yunlu Zou, San Diego, CA (US); Peyman Najmabadi, San Diego, CA (US)

(73) Assignee: LEICA BIOSYSTEMS IMAGING, INC., Vista, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/705,012

(22) Filed: Dec. 5, 2019

(65) Prior Publication Data

US 2020/0110253 A1 Apr. 9, 2020

Related U.S. Application Data

(63) Continuation of application No. 16/147,476, filed on Sep. 28, 2018, now Pat. No. 10,502,941.

(60) Provisional application No. 62/566,178, filed on Sep. 29, 2017.

(51) Int. Cl.
G02B 21/00 (2006.01)
G02B 21/26 (2006.01)
H04N 9/04 (2006.01)

(52) U.S. Cl.
CPC ....... *G02B 21/008* (2013.01); *G02B 21/0032* (2013.01); *G02B 21/26* (2013.01); *H04N 9/0451* (2018.08); *G02B 21/0076* (2013.01)

(58) Field of Classification Search
CPC ... G02B 21/0032; G02B 21/34; G02B 21/002
See application file for complete search history.

(56) References Cited

U.S. PATENT DOCUMENTS 5,932,872 A * 8/1999 Price .................. G01N 15/147
250/201.3
6,724,489 B2 4/2004 Freifeld
8,369,591 B2 2/2013 Perz et al.
(Continued)

OTHER PUBLICATIONS

International Search Report and Written Opinion dated Dec. 4, 2018 for related International Application No. PCT/US2018/053639, in 14 pages.

*Primary Examiner* — Paulos M Natnael
(74) *Attorney, Agent, or Firm* — Procopio; Pattric J. Rawlins; Jonathan D. Cheng

(57) ABSTRACT

Apparatus and methods for scanning a 2D or 3D image of a specimen without relative Z-axis motion between the specimen and the objective lens. In an embodiment, the apparatus includes a tilted camera having individual lines of pixels. Each line of pixels can be separately processed and is at a different image plane with respect to the stage. The depth of field of each line of pixels abuts, slightly overlaps, or is slightly spaced apart from the adjacent lines of pixels in the tilted camera. The angle of the tilt determines the relationship (abut, overlapping, or spaced) of the adjacent lines of pixels. The individual image lines produced by each line of pixels can be combined into a 3D volume image of a sample. Also, the highest-contrast line at each X-Y location can be combined into an in-focus 2D image of the sample.

25 Claims, 5 Drawing Sheets

(56) References Cited

U.S. PATENT DOCUMENTS

| | | | |
|---|---|---|---|
| 10,097,815 B2 | 10/2018 | Fisker et al. | |
| 10,409,049 B2 * | 9/2019 | Zou | G02B 21/365 |
| 10,481,377 B2 * | 11/2019 | Chen | G02B 21/0076 |
| 10,502,941 B2 * | 12/2019 | Zou | G02B 21/008 |
| 10,585,273 B2 * | 3/2020 | Chen | H04N 5/2256 |
| 2001/0035489 A1 | 11/2001 | Chaleff et al. | |
| 2004/0170312 A1 | 9/2004 | Soenksen | |
| 2004/0256538 A1 | 12/2004 | Olson et al. | |
| 2005/0179899 A1 | 8/2005 | Palti-Wasserman et al. | |
| 2005/0281484 A1 | 12/2005 | Perz et al. | |
| 2006/0002636 A1 | 1/2006 | Torre-Bueno et al. | |
| 2007/0147673 A1 | 6/2007 | Crandall | |
| 2009/0231689 A1 | 9/2009 | Pittsyn et al. | |
| 2009/0295963 A1 | 12/2009 | Bamford et al. | |
| 2011/0115897 A1 | 5/2011 | Najmabadi et al. | |
| 2012/0099852 A1 | 4/2012 | Staker et al. | |
| 2012/0287256 A1 | 11/2012 | Hulsken et al. | |
| 2015/0130920 A1 * | 5/2015 | Zou | G02B 21/245 348/79 |
| 2018/0188517 A1 * | 7/2018 | Zou | G02B 21/361 |
| 2018/0275388 A1 * | 9/2018 | Zou | G02B 21/18 |
| 2019/0101723 A1 | 4/2019 | Olson et al. | |
| 2019/0101739 A1 | 4/2019 | Chen et al. | |
| 2020/0026056 A1 * | 1/2020 | Zou | H04N 1/193 |

\* cited by examiner

TWO-DIMENSIONAL AND THREE-DIMENSIONAL FIXED Z SCANNING

CROSS-REFERENCE TO RELATED APPLICATIONS

The present application is a continuation of U.S. patent application Ser. No. 16/147,476, filed on Sep. 28, 2018, which claims priority to U.S. Provisional Patent App. No. 62/566,178, filed on Sep. 29, 2017, which are both hereby incorporated herein by reference as if set forth in full.

BACKGROUND

Field of the Invention

The present invention generally relates to the field of digital pathology, and more particularly, to three-dimensional (3D) and two-dimensional (2D) scanning without relative movement between the stage that supports the sample and the objective lens.

Related Art

When the depth of an object is larger than the depth of field (DoF) covered by an imaging device, in order to approximate a 3D image of the object, conventional image scanning systems scan a series of 2D planar images at various depths within the object using limited DoF optics, and subsequently combine the 2D planar images into a Z-stack image. This process is referred to as Z stacking and the resulting 3D Z-stack image has gaps (i.e., areas for which there is no image data) between the image data of the various 2D planar images. These gaps are typically filled in by interpolating image data between two scanned 2D planar images using the image data for that pair of 2D planar images. Z stacking suffers because it is a slow process and requires multiple repeated movements of the stage to scan each 2D planar image. Specifically, in a whole slide imaging ("WSI") scanning device, points of interest on a slide may be located beyond the DoF of the objective, for instance, in a cytology slide having a thick sample. In such a situation, Z stacking is typically used to scan the various layers of the cytology sample on the slide.

In contrast, for a thin tissue sample, the upper surface of the tissue may not be absolutely flat across the whole slide. In order to keep the scanned image of the surface of the tissue in focus across the whole slide, autofocus techniques that use a predetermined focus map or a dynamic focusing scheme are needed. Dynamic focusing is advantageously fast, but one or more sensors, in addition to the primary imaging sensor, are needed, and a complicated feedback loop is typically required to maintain focus. The focus map method requires additional pre-scanning steps and is consequently slow. Furthermore, both the dynamic and focus map techniques require relative movement in the Z axis, between the sample and the objective lens, to allow the focal plane of the primary imaging sensor to follow the tissue topography during the scan. Accordingly, both techniques suffer from the complexity of requiring constant control of the Z axis. Therefore, what is needed is a system and method that overcomes these significant problems found in the conventional systems described above.

SUMMARY

To address the problems found in conventional systems, systems and methods are described herein for 2D and 3D fixed Z scanning. In an embodiment, a digital scanning apparatus is configured with an area scan sensor that comprises a plurality of individual sensor pixels arranged in an M×N rectangle, where M and N are not equal to one (1). In an embodiment, each row of the sensor is individually addressable, such that the image data for a single row of the sensor can be accessed and manipulated. In another embodiment, each pixel of the sensor is individually addressable, such that the image data for each single pixel of the sensor can be accessed and manipulated.

The area scan sensor may be logically tilted with respect to the optical axis such that each row of the sensor is at a separate height that any other row of the sensor with respect to the optical path, and so that all pixels of a single row are at the same height with respect to the optical path. Additionally, the distance between the rows of the tilted sensor may be configured to substantially abut the DoF of respective adjacent sensor pixels, such that the image data generated by the tilted sensor has very slight overlaps, no overlaps or gaps, or very slight gaps in the height dimension with respect to the optical path. This advantageously results in contiguous 3D volume image data with very slight image data overlaps, no image data overlaps or gaps, or very slight image data gaps. Therefore, there is no need to interpolate image data between scanned image planes in the 3D volume image. As used herein in connection with 3D volume image data, the term "contiguous" means that the image data for adjacent image planes in the height dimension of a 3D volume image have small image data overlaps, no image data overlaps or gaps, or small image data gaps.

During scanning, the tilted sensor generates image data across a range of distances (e.g., heights) with respect to the optical path. Advantageously, the range of distances is configured to encompass the entire depth of a specimen on the slide being scanned. Accordingly, a single pass of the specimen under the tilted sensor generates image data for the entire depth of the specimen and for the entire surface of the specimen. The scanned image data is used to generate a 3D image of the entire thickness of the specimen and/or to generate a 2D image of the surface of the specimen.

In an embodiment, a digital scanning apparatus is disclosed that comprises: a motorized stage configured to support a specimen and move the specimen at a substantially constant velocity; an illumination system configured to illuminate a portion of the specimen; an objective lens positioned for viewing the illuminated portion of the specimen; a camera optically coupled with the objective lens, the camera comprising a plurality of light responsive elements disposed in at least two linear arrays, wherein the light responsive elements of a first linear array are positioned in a first image plane with respect to the motorized stage and the light responsive elements of a second linear array are positioned in a second image plane with respect to the motorized stage, wherein the first image plane and the second image plane are not identical; a processor configured to process light intensities from the plurality of light-responsive elements in the first image plane during a first movement of the motorized stage to generate a first image of a first portion of the specimen in the first image plane, the processor further configured to process light intensities from the plurality of light-responsive elements in the second image plane during the first movement of the motorized stage to generate a second image of the first portion of the specimen in the second image plane, wherein the processor is further configured to align the first image and the second image into a contiguous volume image of the first portion of the specimen.

In an embodiment, a digital scanning apparatus is disclosed that comprises: a motorized stage configured to support a specimen and move the specimen at a substantially constant velocity; an illumination system configured to illuminate a portion of the specimen; an objective lens positioned for viewing the illuminated portion of the specimen; a camera optically coupled with the objective lens, the camera comprising a first plurality of light responsive elements disposed in a first linear array, wherein the light responsive elements of the first linear array are positioned in a first image plane with respect to the motorized stage and the light responsive elements of the first linear array are positioned orthogonal to a direction of travel of the motorized stage, and the light responsive elements of the first linear array are configured to generate a plurality of first lines of image data in synchrony with the substantially constant velocity of the motorized stage, the camera further comprising a second plurality of light responsive elements disposed in a second linear array, wherein the light responsive elements of the second linear array are positioned in a second image plane with respect to the motorized stage and the light responsive elements of the second linear array are positioned orthogonal to the direction of travel of the motorized stage, and the light responsive elements of the second linear array are configured to generate a plurality of second lines of image data in synchrony with the substantially constant velocity of the motorized stage, wherein each line of image data in the second plurality of second lines of image data has a corresponding line of image data in the first plurality of first lines of image data; a processor configured to determine a contrast value for each line of image data in the plurality of first lines of image data, determine a contrast value for each line of image data in the plurality of second lines of image data, compare the contrast value of each line of image data in the plurality of second lines of image data to the contrast value of its corresponding line of image data in the plurality of first lines of image data to determine a highest contrast value line of image data for each set of corresponding first lines of image data and second lines of image data, and combine the highest contrast value lines of image data from each set of corresponding first lines of image data and second lines of image data to generate a first image of a first portion of the specimen.

The camera may comprise a plurality of linear arrays and each of the plurality linear arrays may be positioned in a respective image plane of a plurality of image planes, wherein said plurality of linear arrays is greater than two. At least one image plane in the plurality of image planes may be contiguous or overlap with at least one other image plane in the plurality of image planes. The plurality of image planes may encompass an entire thickness of a specimen. The processor may be further configured to align a plurality of images corresponding to the plurality of image planes into a contiguous volume image of the entire thickness of a portion of the specimen. The processor may be further configured to align a plurality of contiguous volume images of a plurality of portions of the specimen into a contiguous volume image of the entire specimen. Each linear array may comprise a color linear array, a time delay integration (TDI) linear array, or a color TDI linear array. The plurality of image planes may comprise a combined depth of field of at least 100 microns.

Other features and advantages of the present invention will become more readily apparent to those of ordinary skill in the art after reviewing the following detailed description and accompanying drawings.

BRIEF DESCRIPTION OF THE DRAWINGS

The structure and operation of the present invention will be understood from a review of the following detailed description and the accompanying drawings in which like reference numerals refer to like parts and in which.

DETAILED DESCRIPTION

Certain embodiments disclosed herein provide systems and methods for 3D and 2D scanning of a sample without relative movement between the sample and the objective lens in a distance dimension along the optical path. After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1:
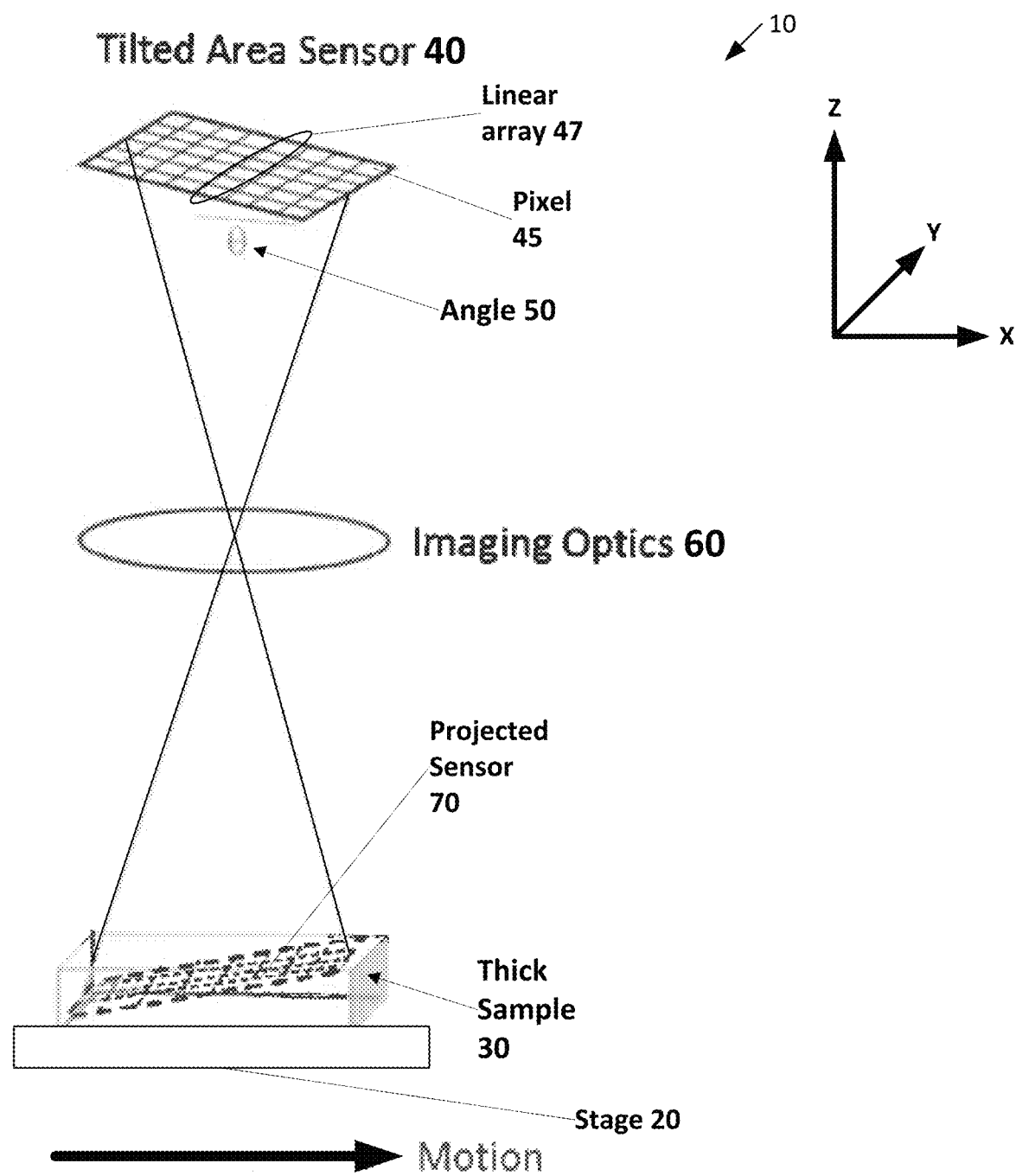
FIG. 1 is a block diagram illustrating an example system for 2D and 3D fixed Z scanning, according to an embodiment.

FIG. 1 is a block diagram illustrating an example system 10 for 2D and 3D fixed Z scanning, according to an embodiment. In the illustrated embodiment, the system 10 includes a movable stage 20 that supports a sample 30. The system 10 also includes a tilted area sensor 40 that comprises a plurality of individual light-responsive elements 45, which are also referred to as "picture elements" or "pixels." Groups of pixels are arranged into linear arrays 47, and each linear array 47 is positioned in a different image plane with respect to the stage 20. Advantageously, the angle 50 (labeled θ), at which the sensor 40 is tilted, facilitates each linear array 47 of pixels 45 being positioned in a different image plane with respect to the stage 20. The system 10 also includes imaging optics 60, such as an objective lens in the optical path.

When a field of view of the sample 30 is projected onto the tilted sensor 40, each individual linear array 47 is positioned in a different image plane than the other linear arrays 47. Thus, when the stage 20 moves, each of the individual linear arrays 47 scans an image at that array's respective image plane. Advantageously, this positioning allows the single tilted sensor 40 to scan a 2D image at each of the different image planes, during the ongoing motion of the stage 20. In doing so, the single tilted sensor 40 can scan the entire thickness of a portion (e.g., stripe) of the sample 30 in a single movement of the stage 20. The individual 2D images at different image planes can then be combined into a contiguous 3D volume image of a portion of the sample 30. In this fashion, a 3D volume image of a portion of the sample can be generated without any relative Z axis movement between the stage and the imaging optics 60. Additionally, plural portions (e.g., stripes) can be combined to generate a 3D volume image of the entire sample.

Figure 2:
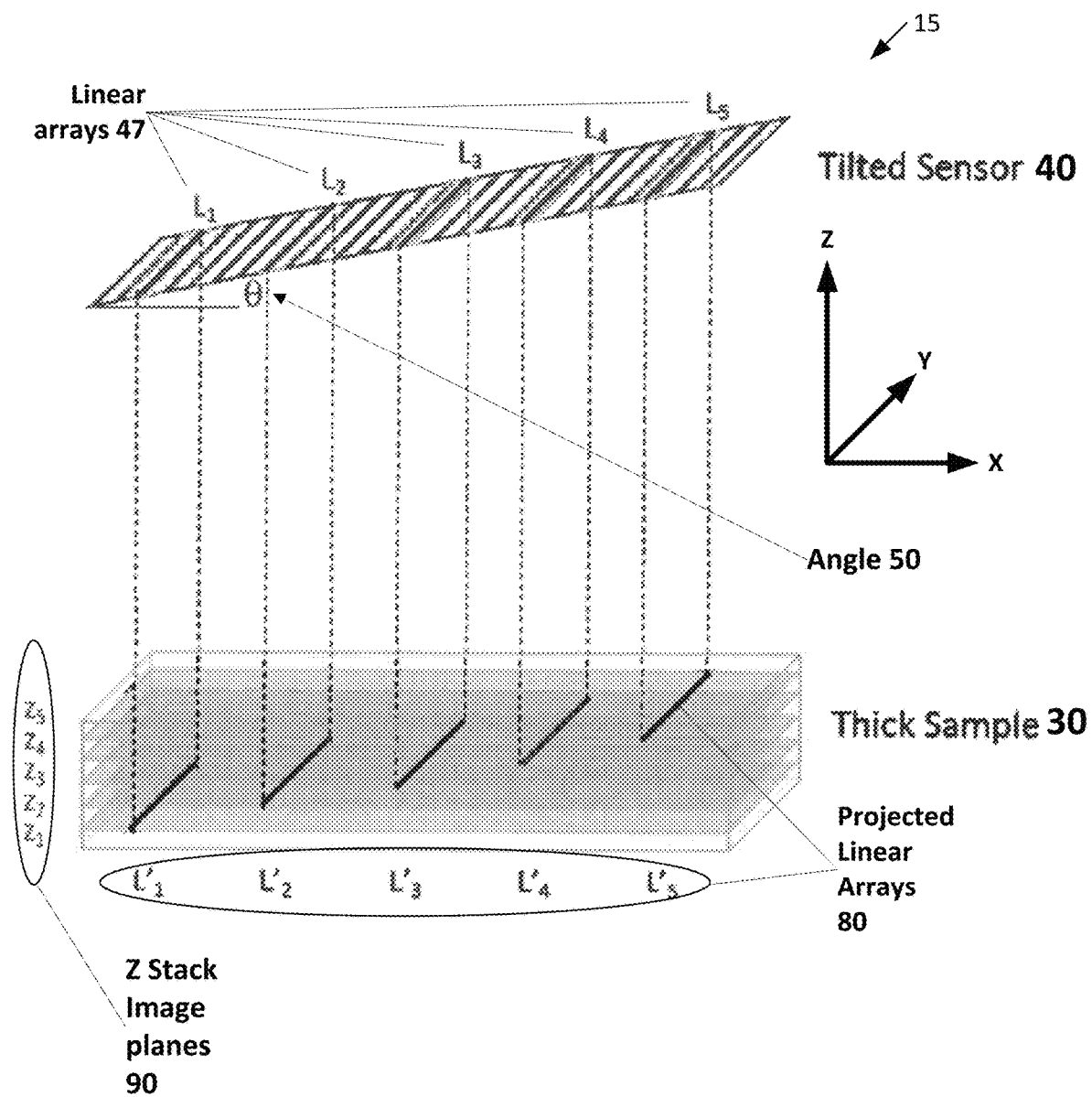
FIG. 2 is a block diagram illustrating an example system for 2D and 3D fixed Z scanning, according to an embodiment.

FIG. 2 is a block diagram illustrating an example system 15 for 2D and 3D fixed Z scanning, according to an embodiment. In the illustrated embodiment, the tilted sensor 40 includes a plurality of linear arrays 47 that each include a plurality of individual pixels. The sensor 40 is tilted at an angle 50 (labeled θ) that positions each linear array 47 of the sensor 40 in a different image plane ($Z_1$, $Z_2$, $Z_3$, $Z_4$, $Z_5$, etc.) with respect to the stage (not shown) that supports the sample 30. When the linear arrays 47 are projected into their respective image planes with respect to the stage 20, they are illustrated at different height positions ($L'_1$, $L'_2$, $L'_3$, $L'_4$, $L'_5$,) within the sample 30. The distance (ΔZ) between the linear arrays in the optical path (Z) dimension is determined by the angle 50 (labeled θ) at which the sensor 40 is tilted and the distance between each linear array 47 (ΔL) according to the following equation:

$$(\Delta Z) = (\Delta L) * \sin(\theta)$$

Example Embodiments

In a first embodiment configured for 3D scanning without relative movement between the stage that supports a sample and the imaging optics (e.g., the objective lens), a digital scanning apparatus comprises a motorized stage that is configured to support the specimen and move the specimen at a substantially constant velocity. The apparatus also includes an illumination system configured to illuminate a portion of the specimen and an objective lens positioned for viewing the illuminated portion of the specimen.

The digital scanning apparatus also includes a camera that is optically coupled with the objective lens. The camera includes a plurality of light responsive elements (pixels) that are disposed in at least two linear arrays. The pixels of the first linear array are positioned in a first image plane with respect to the motorized stage and the pixels of the second linear array are positioned in a second image plane with respect to the motorized stage.

The digital scanning apparatus also includes a processor that is configured to process light intensities from the plurality of pixels in the first image plane during a first movement of the motorized stage to generate a first image of a first portion of the specimen in the first image plane. The processor is also configured to process light intensities from the plurality of pixels in the second image plane during the same first movement of the motorized stage to generate a second image of the same first portion of the specimen in the second image plane. The processor is also configured to align the first image and the second image into a contiguous 3D volume image of the first portion of the specimen. Generation of a contiguous 3D volume image is advantageously accomplished without relative movement between the stage that supports the specimen and the imaging optics (e.g., the objective lens).

The camera of the digital scanning apparatus may also include a large number of linear arrays of pixels, for example ten (10), one thousand (1,000), four thousand (4,000), or even more linear arrays may be included in the camera. Because the individual pixels of a linear array each have the same depth of field of view (referred to as depth of field), the depth of field covered by the linear array defines the image plane in which the linear array is positioned. Accordingly, the arrangement of the linear arrays in the camera may be such that the image planes of adjacent linear arrays abut, overlap, or have a gap between them. Advantageously, the depth of field covered by the entire camera as determined by the individual linear arrays can be configured to be large enough to encompass the entire thickness of an extra thick specimen, and thereby encompass the entire thickness of substantially all specimens that are scanned by the digital scanning apparatus. In an embodiment, the DoF covered by the entire camera is 100 microns. In alternative embodiments, the DoF of the entire camera may range from 10 to 1,000 microns.

Additionally, the processor of the digital scanning apparatus is configured to align a plurality of images of the same portion of the specimen captured by different linear arrays in different image planes. The aligned images advantageously form a contiguous 3D volume image of the entire thickness of the portion of the specimen. The processor may also align a plurality of 3D volume image portions of the specimen into a contiguous 3D volume image of the entire specimen.

In different configurations, the linear arrays of the digital scanning apparatus may comprise a color linear array, time delay integration (TDI) linear arrays, or color TDI linear arrays.

In a second embodiment configured for 2D scanning without relative movement between the stage that supports a specimen and the imaging optics (e.g., the objective lens), a digital scanning apparatus comprises a motorized stage configured to support a specimen and move the specimen at a substantially constant velocity, an illumination system configured to illuminate a portion of the specimen, an objective lens positioned for viewing the illuminated portion of the specimen, and a camera optically coupled with the objective lens.

The camera includes a first plurality of light responsive elements (pixels) disposed in a first linear array, wherein the pixels of the first linear array are positioned in a first image plane with respect to the motorized stage and are positioned orthogonal to a direction of travel of the motorized stage. The pixels of the first linear array are configured to generate light intensities in synchrony with the substantially constant velocity of the motorized stage, and the light intensities are converted into a plurality of first lines of image data.

The camera also includes a second plurality of pixels disposed in a second linear array, wherein the pixels of the second linear array are positioned in a second image plane with respect to the motorized stage and also are positioned orthogonal to the direction of travel of the motorized stage. The pixels of the second linear array are also configured to generate light intensities in synchrony with the substantially constant velocity of the motorized stage. The light intensities are converted into a plurality of second lines of image data, and each second line of image data has a corresponding first line of image data.

The digital scanning apparatus also includes a processor that is configured to determine a contrast value for each first line of image data and for each second line of image data, for example, using a merit function. The processor compares the contrast value of a first line of image data to the contrast value of its corresponding second line of image data to determine the line of image data that has the highest contrast value in each group of corresponding lines of image data.

The number of lines of image data in a group of corresponding lines of image data may be equal to the number of linear arrays on the camera.

The processor is also configured to combine the lines of image data having the highest contrast values from each group of corresponding lines of image data to generate an image of a portion of the surface of the specimen. This is advantageously accomplished without relative movement between the stage that supports the specimen and the imaging optics (e.g., the objective lens).

The camera of the digital scanning apparatus may also include a large number of linear arrays of pixels, for example ten (10), one thousand (1,000), four thousand (4,000), or even more linear arrays may be included in the camera. Because the individual pixels of a linear array each have the same depth to field of view (referred to as depth of field), the depth of field covered by the linear array defines the image plane in which the linear array is positioned. Accordingly, the arrangement of the linear arrays in the camera may be such that the image planes of adjacent linear arrays abut, overlap, or have a gap between them. Advantageously, the depth of field covered by the entire camera as determined by the individual linear arrays can be configured to be large enough to encompass the entire range, with respect to the optical path, of the surface of a specimen that is scanned by the digital scanning apparatus. In an embodiment, the DoF covered by the entire camera is 100 microns. In alternative embodiments, the DoF of the entire camera may range from 10 to 1,000 microns.

Additionally, the processor of the digital scanning apparatus is configured to align a plurality of images of the same portion of the specimen captured by different linear arrays in different image planes. The aligned images advantageously form a contiguous 3D volume image of the entire thickness of the portion of the specimen. The processor may also align a plurality of 3D volume image portions of the specimen into a contiguous 3D volume image of the entire specimen.

In different configurations, the linear arrays of the digital scanning apparatus may comprise a color linear array, time delay integration (TDI) linear arrays, or color TDI linear arrays.

Example Processes

Figure 3:
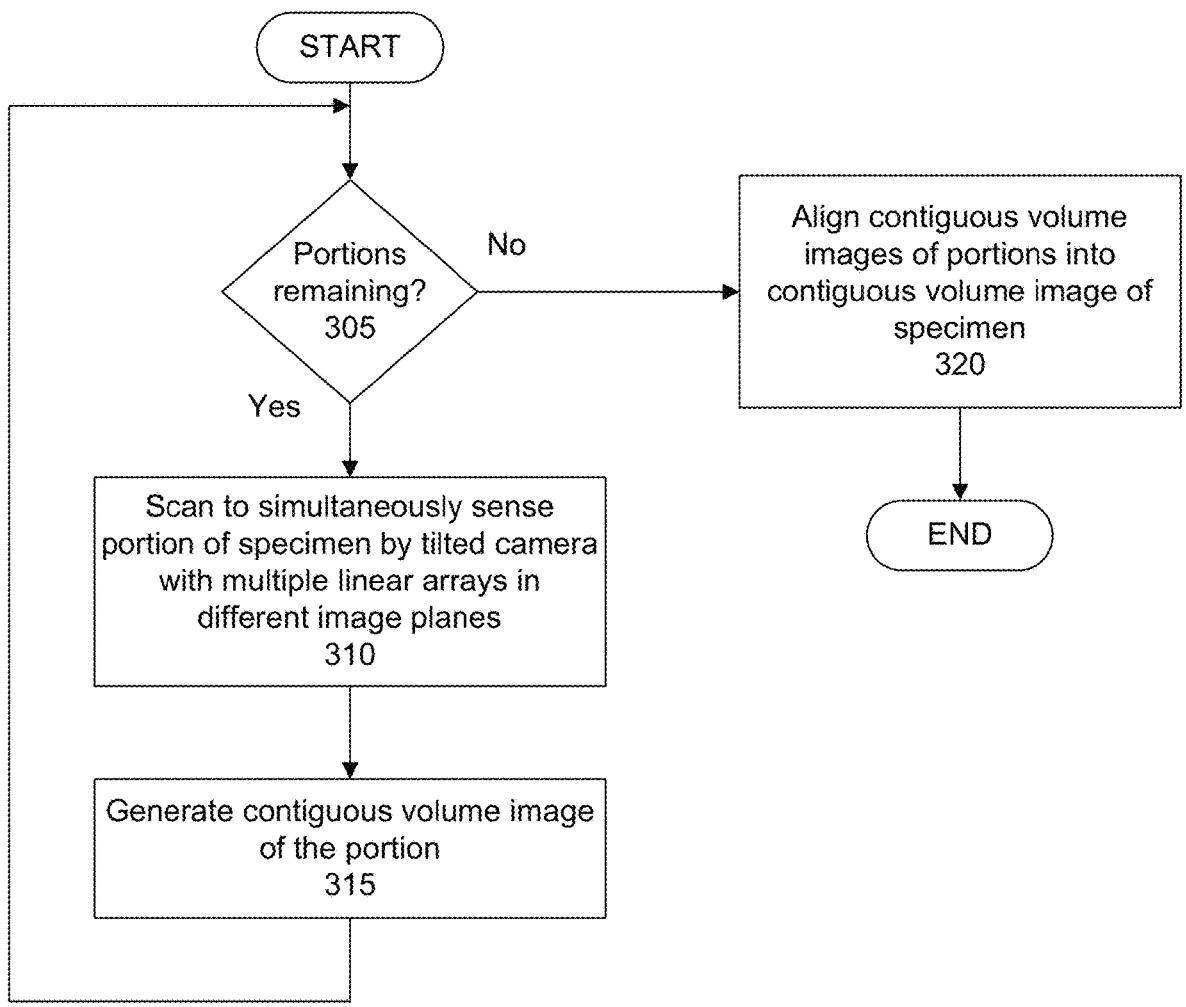
FIG. 3 is a flowchart illustrating an example process for 3D fixed Z scanning, according to an embodiment.

FIG. 3 is a flowchart illustrating an example process for 3D fixed Z scanning, according to an embodiment. While the process is illustrated with a certain arrangement and ordering of steps, the process may be implemented with fewer, more, or different steps and a different arrangement and/or ordering of steps. It should be understood that the process may be implemented by at least one hardware processor of a digital scanning apparatus.

As illustrated, steps 310 and 315 are performed for each portion of a specimen or other sample to be scanned. Specifically, if a portion remains to be scanned (i.e., "Yes" in step 305), in step 310, that portion is scanned by a tilted camera, having multiple linear arrays in different image planes, to simultaneously sense the portion of the specimen in each of the different image planes. The portion of the specimen may be sensed while the distance between the objective lens of the digital scanning apparatus and the specimen is fixed. Then, in step 315, a contiguous volume image is generated to comprise the sensed portion of the specimen in each of the different image planes. On the other hand, if no portion of the specimen remains to be scanned (i.e., "No" in step 305), in step 320, the contiguous volume images for each sensed portion of the specimen are aligned into a contiguous volume image of the specimen (e.g., the entire specimen or a larger portion of the specimen).

Figure 4:
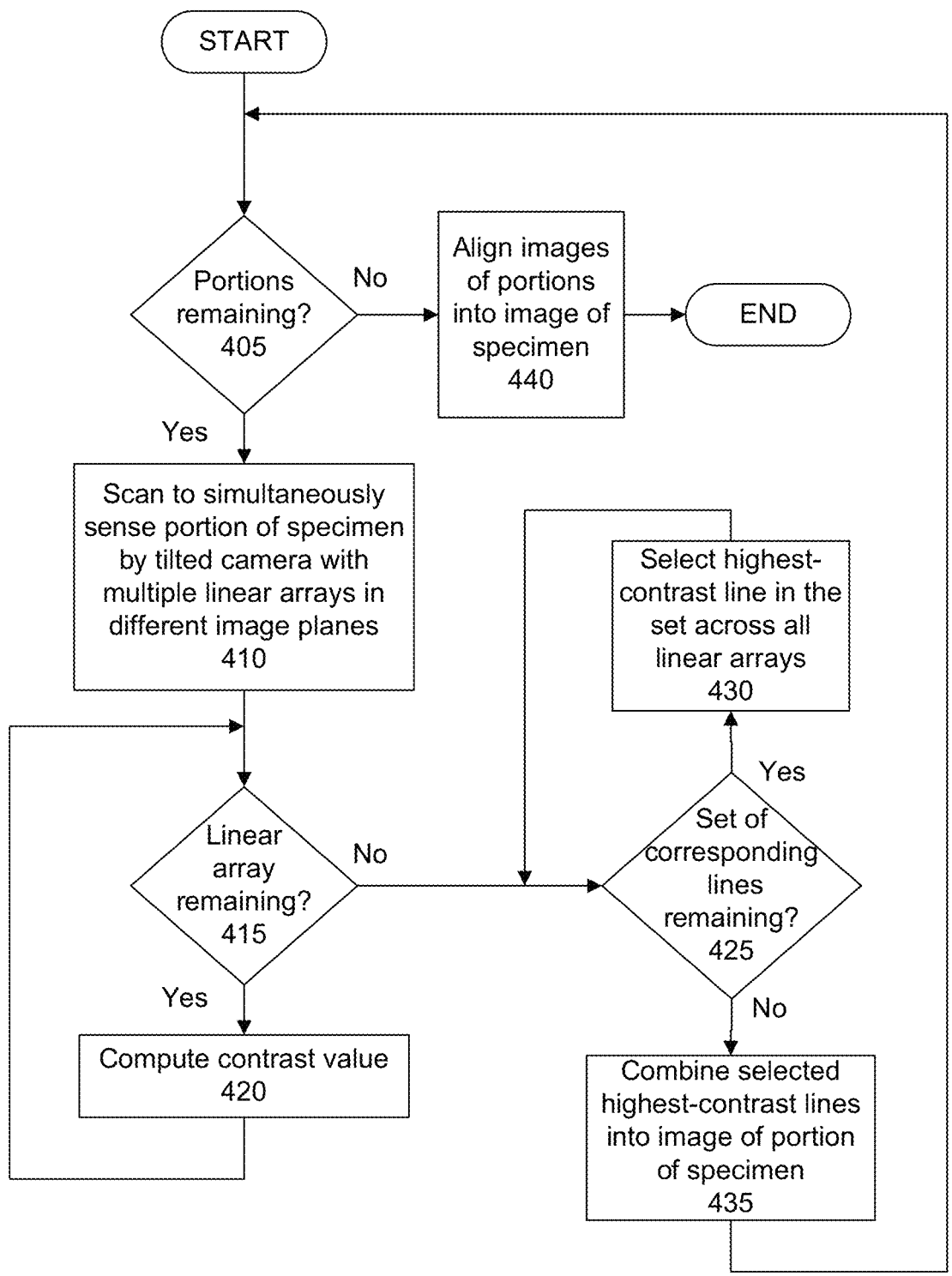
FIG. 4 is a flowchart illustrating an example process for 2D fixed Z scanning, according to an embodiment.

FIG. 4 is a flowchart illustrating an example process for 2D fixed Z scanning, according to an embodiment. While the process is illustrated with a certain arrangement and ordering of steps, the process may be implemented with fewer, more, or different steps and a different arrangement and/or ordering of steps. It should be understood that the process may be implemented by at least one hardware processor of a digital scanning apparatus.

As illustrated, steps 410-435 are performed for each portion of a specimen or other sample to be scanned. Specifically, if a portion remains to be scanned (i.e., "Yes" in step 405), in step 410, that portion is scanned by a tilted camera, having multiple linear arrays in different image planes, to simultaneously sense the portion of the specimen in each of the different image planes. Then, step 420 is performed for each linear array in the tilted camera. Specifically, if a linear array remains to be considered (i.e., "Yes" in step 415), in step 420, a contrast value (e.g., average contrast value) is computed for the linear array. The contrast value may be computed in any disclosed or well-known manner.

On the other hand, if contrast values have been computed for all linear arrays in the camera (i.e., "No" in step 415), step 430 is performed for each set of corresponding lines across the linear arrays. Specifically, each linear array in the camera generates a plurality of lines of image data, and each line of image data corresponds to a line of image data in each of the other linear arrays in the camera. It should be understood that each line in a given set of corresponding lines represents image data of the same field of view of the specimen as the other lines in the set, but captured in a different image plane than the other lines in the set. Each of these sets of corresponding lines (i.e., consisting of a line generated by each of the linear arrays in a different image plane) is considered. If a set of corresponding lines remains to be considered (i.e., "Yes" in step 425), in step 430, the next set of corresponding lines is considered, and the line in the set with the highest contrast is selected. On the other hand, if all sets of corresponding lines have been considered (i.e., "No" in step 425), in step 435, the selected highest-contrast lines from each of the sets of corresponding lines are combined into an image of the portion of the specimen.

Finally, if all portions have been scanned (i.e., "No" in step 405), in step 440, the images of the portions, generated in different iterations of step 435, are aligned into an image of the specimen (e.g., the entire specimen or a larger portion of the specimen).

Example Scanning Apparatus

Figure 5A:
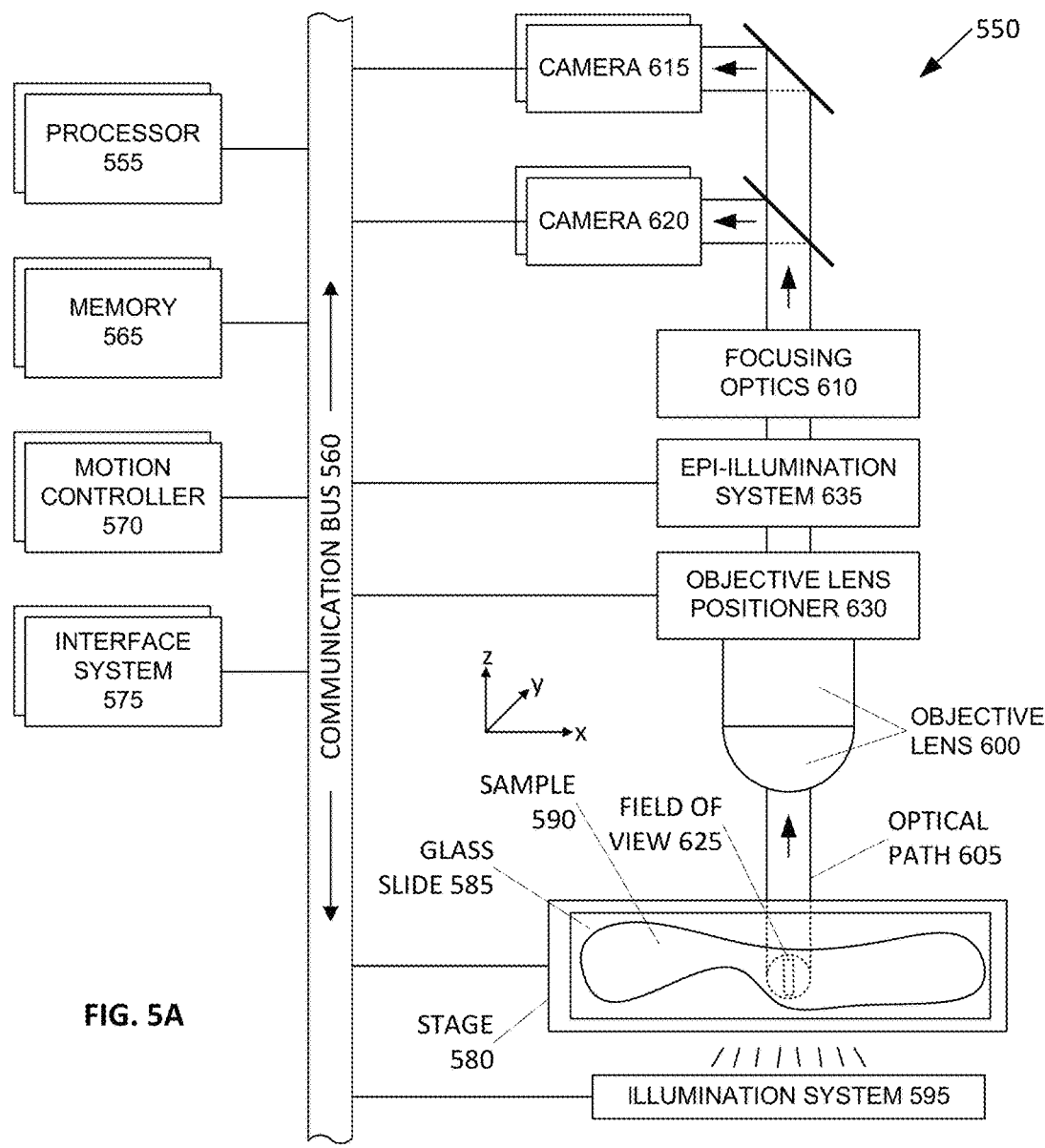
FIG. 5A is a block diagram illustrating an example processor-enabled device that may be used in connection with various embodiments described herein.

FIG. 5A is a block diagram illustrating an example processor-enabled device 550 that may be used in connection with various embodiments described herein. Alternative forms of the device 550 may also be used as will be understood by the skilled artisan. In the illustrated embodiment, the device 550 is presented as a digital imaging device (also referred to herein as a scanner system, a scanning system, a scanning apparatus, a digital scanning apparatus, a digital slide scanning apparatus, etc.) that comprises one or more processors 555, one or more memories 565, one or more motion controllers 570, one or more interface systems 575, one or more movable stages 580 that each support one or more glass slides 585 with one or more samples 590, one or more illumination systems 595 that illuminate the sample, one or more objective lenses 600 that each define an optical path 605 that travels along an optical axis, one or more objective lens positioners 630, one or more optional epi-illumination systems 635 (e.g., included in a fluorescence scanner system), one or more focusing optics 610, one or more line scan cameras 615 and/or one or more additional cameras 620 (e.g., a line scan camera or an area scan camera), each of which define a separate field of view 625 on the sample 590 (e.g., corresponding to sample 210) and/or glass slide 585 (e.g., corresponding to slide 200). The various elements of the scanner system 550 are communicatively coupled via one or more communication busses 560. Although there may be one or more of each of the various elements of the scanner system 550, for the sake of simplicity, these elements will be described herein in the singular except when needed to be described in the plural to convey the appropriate information.

The one or more processors 555 may include, for example, a central processing unit (CPU) and a separate graphics processing unit (GPU) capable of processing instructions in parallel, or the one or more processors 555 may include a multicore processor capable of processing instructions in parallel. Additional separate processors may also be provided to control particular components or perform particular functions, such as image processing. For example, additional processors may include an auxiliary processor to manage data input, an auxiliary processor to perform floating point mathematical operations, a special-purpose processor having an architecture suitable for fast execution of signal-processing algorithms (e.g., digital-signal processor), a slave processor subordinate to the main processor (e.g., back-end processor), an additional processor for controlling the line scan camera 615, the stage 580, the objective lens 225, and/or a display (not shown). Such additional processors may be separate discrete processors or may be integrated with the processor 555.

The memory 565 provides storage of data and instructions for programs that can be executed by the processor 555. The memory 565 may include one or more volatile and/or non-volatile computer-readable storage mediums that store the data and instructions, including, for example, a random access memory, a read only memory, a hard disk drive, a removable storage drive, and/or the like. The processor 555 is configured to execute instructions that are stored in the memory 565 and communicate via communication bus 560 with the various elements of the scanner system 550 to carry out the overall function of the scanner system 550.

The one or more communication busses 560 may include a communication bus 560 that is configured to convey analog electrical signals, and may include a communication bus 560 that is configured to convey digital data. Accordingly, communications from the processor 555, the motion controller 570, and/or the interface system 575, via the one or more communication busses 560, may include both electrical signals and digital data. The processor 555, the motion controller 570, and/or the interface system 575 may also be configured to communicate with one or more of the various elements of the scanning system 550 via a wireless communication link.

The motion control system 570 is configured to precisely control and coordinate X, Y, and/or Z movement of the stage 580 (e.g., within an X-Y plane) and/or the objective lens 600 (e.g., along a Z axis orthogonal to the X-Y plane, via the objective lens positioner 630). The motion control system 570 is also configured to control movement of any other moving part in the scanner system 550. For example, in a fluorescence scanner embodiment, the motion control system 570 is configured to coordinate movement of optical filters and the like in the epi-illumination system 635.

The interface system 575 allows the scanner system 550 to interface with other systems and human operators. For example, the interface system 575 may include a user interface to provide information directly to an operator and/or to allow direct input from an operator. The interface system 575 is also configured to facilitate communication and data transfer between the scanning system 550 and one or more external devices that are directly connected (e.g., a printer, removable storage medium) or external devices such as an image server system, an operator station, a user station, and an administrative server system that are connected to the scanner system 550 via a network (not shown).

The illumination system 595 is configured to illuminate a portion of the sample 590. The illumination system may include, for example, a light source and illumination optics. The light source may comprise a variable intensity halogen light source with a concave reflective mirror to maximize light output and a KG-1 filter to suppress heat. The light source could also comprise any type of arc-lamp, laser, or other source of light. In an embodiment, the illumination system 595 illuminates the sample 590 in transmission mode such that the line scan camera 615 and/or camera 620 sense optical energy that is transmitted through the sample 590. Alternatively, or in combination, the illumination system 595 may also be configured to illuminate the sample 590 in reflection mode such that the line scan camera 615 and/or camera 620 sense optical energy that is reflected from the sample 590. The illumination system 595 may be configured to be suitable for interrogation of the microscopic sample 590 in any known mode of optical microscopy.

In an embodiment, the scanner system 550 optionally includes an epi-illumination system 635 to optimize the scanner system 550 for fluorescence scanning. Fluorescence scanning is the scanning of samples 590 that include fluorescence molecules, which are photon-sensitive molecules that can absorb light at a specific wavelength (excitation). These photon-sensitive molecules also emit light at a higher wavelength (emission). Because the efficiency of this photoluminescence phenomenon is very low, the amount of emitted light is often very low. This low amount of emitted light typically frustrates conventional techniques for scanning and digitizing the sample 590 (e.g., transmission mode microscopy). Advantageously, in an optional fluorescence scanner system embodiment of the scanner system 550, use of cameras 615 and/or 620 that include multiple linear sensor arrays (e.g., a time delay integration ("TDI") line scan camera) increases the sensitivity to light of the line scan camera by exposing the same area of the sample 590 to each of the multiple linear sensor arrays of the cameras 615 and/or 620. This is particularly useful when scanning faint fluorescence samples with low emitted light.

Accordingly, in a fluorescence scanner system embodiment, at least one of the cameras 615 and/or 620 is preferably a monochrome TDI line scan camera. Advantageously, monochrome images are ideal in fluorescence microscopy because they provide a more accurate representation of the actual signals from the various channels present on the sample. As will be understood by those skilled in the art, a fluorescence sample 590 can be labeled with multiple fluorescence dyes that emit light at different wavelengths, which are also referred to as "channels."

Furthermore, because the low and high end signal levels of various fluorescence samples present a wide spectrum of wavelengths for the camera 615 and/or 620 to sense, it is desirable for the low and high end signal levels that the camera 615 and/or 620 can sense to be similarly wide. Accordingly, in a fluorescence scanner embodiment, at least one of the cameras 615 and/or 620 used in the fluorescence scanning system 550 is a monochrome 10-bit 64-linear-array TDI line scan camera. It should be noted that a variety of bit depths for the camera 615 and/or 620 can be employed for use with a fluorescence scanner embodiment of the scanning system 550.

The movable stage 580 is configured for precise X-Y movement under control of the processor 555 or the motion controller 570. The movable stage may also be configured for Z movement under control of the processor 555 or the motion controller 570. The moveable stage is configured to position the sample in a desired location during image data capture by the cameras 615 and/or 620. The moveable stage is also configured to accelerate the sample 590 in a scanning direction to a substantially constant velocity and then maintain the substantially constant velocity during image data capture by at least one of the cameras 615 and/or 620. In an embodiment, the scanner system 550 may employ a high-precision and tightly coordinated X-Y grid to aid in the location of the sample 590 on the movable stage 580. In an embodiment, the movable stage 580 is a linear-motor-based X-Y stage with high precision encoders employed on both the X and Y axes. For example, very precise nanometer encoders can be used on the axis in the scanning direction and on the axis that is in the direction perpendicular to the scanning direction and on the same plane as the scanning direction. The stage is also configured to support the glass slide 585 upon which the sample 590 is disposed.

The sample 590 (e.g., corresponding to sample 210) can be anything that may be interrogated by optical microscopy. For example, a glass microscope slide 585 (e.g., corresponding to slide 200) is frequently used as a viewing substrate for specimens that include tissues and cells, chromosomes, DNA, protein, blood, bone marrow, urine, bacteria, beads, biopsy materials, or any other type of biological material or substance that is either dead or alive, stained or unstained, labeled or unlabeled. The sample 590 may also be an array of any type of DNA or DNA-related material such as cDNA or RNA or protein that is deposited on any type of slide or other substrate, including any and all samples commonly known as a microarrays. The sample 590 may be a microtiter plate (e.g., a 96-well plate). Other examples of the sample 590 include integrated circuit boards, electrophoresis records, petri dishes, film, semiconductor materials, forensic materials, or machined parts.

Objective lens 600 is mounted on the objective positioner 630, which, in an embodiment, employs a very precise linear motor to move the objective lens 600 along the optical axis defined by the objective lens 600. For example, the linear motor of the objective lens positioner 630 may include a 50 nanometer encoder. The relative positions of the stage 580 and the objective lens 600 in X, Y, and/or Z axes are coordinated and controlled in a closed-loop manner using motion controller 570 under the control of the processor 555 that employs memory 565 for storing information and instructions, including the computer-executable programmed steps for overall scanning system 550 operation.

In an embodiment, the objective lens 600 is a plan apochromatic ("APO") infinity corrected objective with a numerical aperture corresponding to the highest spatial resolution desirable, where the objective lens 600 is suitable for transmission-mode illumination microscopy, reflection-mode illumination microscopy, and/or epi-illumination-mode fluorescence microscopy (e.g., an Olympus 40 X, 0.75NA or 20X, 0.75 NA). Advantageously, the objective lens 600 is capable of correcting for chromatic and spherical aberrations. Because the objective lens 600 is infinity corrected, the focusing optics 610 can be placed in the optical path 605 above the objective lens 600 where the light beam passing through the objective lens becomes a collimated light beam. The focusing optics 610 focus the optical signal captured by the objective lens 600 onto the light-responsive elements of the cameras 615 and/or 620 and may include optical components such as filters, magnification changer lenses, and/or the like. The objective lens 600 combined with the focusing optics 610 provides the total magnification for the scanning system 550. In an embodiment, the focusing optics 610 may contain a tube lens and an optional 2× magnification changer. Advantageously, the 2× magnification changer allows a native 20 X objective lens 600 to scan the sample 590 at 40× magnification.

One or more of the cameras 615 and/or 620 may comprise at least one linear array of picture elements ("pixels"). The cameras 615 and/or 620 may be monochrome or color. Color line scan cameras typically have at least three linear arrays, while monochrome line scan cameras may have a single linear array or plural linear arrays. Any type of singular or plural linear array, whether packaged as part of a camera or custom-integrated into an imaging electronic module, can also be used. For example, a 3 linear array ("red-green-blue" or "RGB") color line scan camera or a 96 linear array monochrome TDI may also be used. TDI line scan cameras typically provide a substantially better signal-to-noise ratio ("SNR") in the output signal by summing intensity data from previously imaged regions of a specimen, yielding an increase in the SNR that is in proportion to the square-root of the number of integration stages. TDI line scan cameras comprise multiple linear array. For example, TDI line scan cameras are available with 24, 32, 48, 64, 96, or even more linear arrays. The scanner system 550 also supports linear arrays that are manufactured in a variety of formats, including some with 512 pixels, some with 1024 pixels, and others having as many as 4096 pixels. Similarly, linear arrays with a variety of pixel sizes can also be used in the scanner system 550. The salient requirement for the selection of any type of line scan camera for the cameras 615 and/or 620 is that the motion of the stage 580 can be synchronized with the line rate of the line scan camera, so that the stage 580 can be in motion with respect to the line scan camera during the digital image capture of the sample 590.

The image data generated by the line scan camera 615 and/or 620 is stored in a portion of the memory 565 and processed by the processor 555 to generate a contiguous digital image of at least a portion of the sample 590. The contiguous digital image can be further processed by the processor 555, and the revised contiguous digital image can also be stored in the memory 565.

In an alternative embodiment, the camera 615 and/or 620 can be an area scan camera with each line being independent in order to function as a series of physically integrated line scan cameras. Furthermore, each of the individual lines can be logically positioned at a different distance along the optical path such that all of the pixels in each line of the area scan camera is in the same image plane with respect to the optical path and such that no two pixels of any two separate lines are in the same image plane with respect to the optical path. Advantageously, this camera arrangement allows the combined area scan camera 615 and/or 620 to image a thick specimen at plural image planes, and thereby construct a volume image of the thick specimen. Alternatively, or in combination, this camera arrangement allows the individual line having the highest contrast value at each X-Y location to be combined with the other highest contrast value individual lines to construct a well-focused 2D image of the surface of the specimen.

In operation, the various components of the scanner system 550 and the programmed modules stored in memory 565 enable automatic scanning and digitizing of the sample 590, which is disposed on a glass slide 585. The glass slide 585 is securely placed on the movable stage 580 of the scanner system 550 for scanning the sample 590. Under control of the processor 555, the movable stage 580 accelerates the sample 590 to a substantially constant velocity for sensing by the line scan camera 615 and/or 620, where the speed of the stage is synchronized with the line rate of the line scan camera 615. After scanning a stripe of image data, the movable stage 580 decelerates and brings the sample 590 to a substantially complete stop. The movable stage 580 then moves orthogonal to the scanning direction to position the sample 590 for scanning of a subsequent stripe of image data (e.g., an adjacent stripe). Additional stripes are subsequently scanned until an entire portion of the sample 590 or the entire sample 590 is scanned.

For example, during digital scanning of the sample 590, a digital image of the sample 590 is acquired as a plurality of fields of view that are combined together to form an image stripe. A plurality of adjacent image stripes are similarly combined together to form a digital image of a portion or the entire sample 590. The scanning of the sample 590 may include acquiring vertical image stripes or horizontal image stripes. The scanning of the sample 590 may be either top-to-bottom, bottom-to-top, or both (bi-directional), and may start at any point on the sample. Alternatively, the scanning of the sample 590 may be either left-to-right, right-to-left, or both (bi-directional), and may start at any point on the sample. Additionally, it is not necessary that image stripes be acquired in an adjacent or contiguous manner. Furthermore, the resulting image of the sample 590 may be an image of the entire sample 590 or only a portion of the sample 590.

In an embodiment, computer-executable instructions (e.g., programmed modules and software) are stored in the memory 565 and, when executed, enable the scanning system 550 to perform the various functions described herein. In this description, the term "computer-readable storage medium" is used to refer to any media used to store and provide computer executable instructions to the scanning system 550 for execution by the processor 555. Examples of these media include memory 565 and any removable or external storage medium (not shown) communicatively coupled with the scanning system 550 either directly or indirectly, for example via a network (not shown).

Figure 5B:
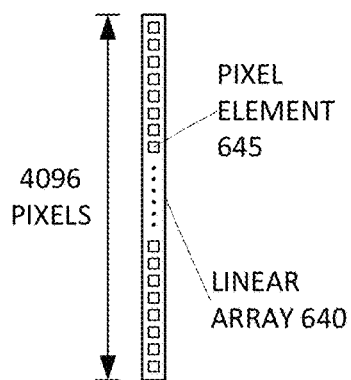
FIG. 5B is a block diagram illustrating an example line scan camera having a single linear array, according to an embodiment.

FIG. 5B illustrates a line scan camera having a single linear array 640, which may be implemented as a charge coupled device ("CCD") array. The single linear array 640 comprises a plurality of individual pixels 645. In the illustrated embodiment, the single linear array 640 has 4096 pixels. In alternative embodiments, linear array 640 may have more or fewer pixels. For example, common formats of linear arrays include 512, 1024, and 4096 pixels. The pixels 645 are arranged in a linear fashion to define a field of view 625 for the linear array 640. The size of the field of view varies in accordance with the magnification of the scanner system 550.

Figure 5C:
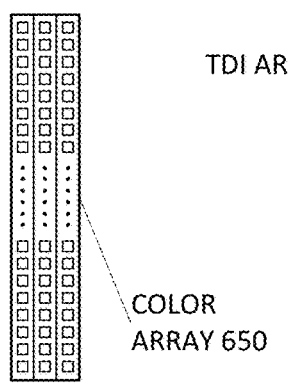
FIG. 5C is a block diagram illustrating an example line scan camera having three linear arrays, according to an embodiment.

FIG. 5C illustrates a line scan camera having three linear arrays, each of which may be implemented as a CCD array. The three linear arrays combine to form a color array 650. In an embodiment, each individual linear array in the color array 650 detects a different color intensity, for example red, green, or blue. The color image data from each individual linear array in the color array 650 is combined to form a single field of view 625 of color image data.

Figure 5D:
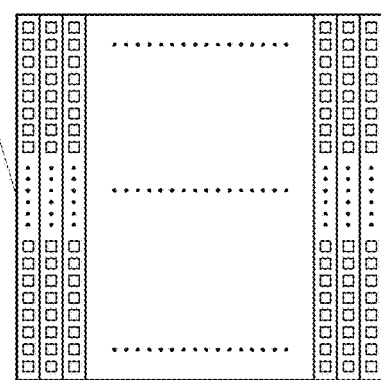
FIG. 5D is a block diagram illustrating an example line scan camera having a plurality of linear arrays, according to an embodiment.

FIG. 5D illustrates a line scan camera having a plurality of linear arrays, each of which may be implemented as a CCD array. The plurality of linear arrays combine to form a TDI array 655. Advantageously, a TDI line scan camera may provide a substantially better SNR in its output signal by summing intensity data from previously imaged regions of a specimen, yielding an increase in the SNR that is in proportion to the square-root of the number of linear arrays (also referred to as integration stages). A TDI line scan camera may comprise a larger variety of numbers of linear arrays. For example, common formats of TDI line scan cameras include 24, 32, 48, 64, 96, 120, and even more linear arrays.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A digital scanning apparatus comprising:
   a motorized stage configured to support a specimen and move the specimen at a substantially constant velocity;
   an illumination system configured to illuminate a field of view;
   imaging optics defining an optical path that optically couples the illuminated field of view to a camera;
   the camera comprising a plurality of linear arrays, wherein a number of the plurality of linear arrays is greater than ten, wherein each of the plurality of linear arrays comprises a plurality of light-responsive elements, and wherein the camera is tilted with respect to the optical path, such that each of the plurality of linear arrays is positioned in a different one of a plurality of image planes, with respect to the optical path, than any of the other plurality of linear arrays; and
   at least one processor configured to, for each of one or more passes of the motorized stage under the imaging optics at the substantially constant velocity,
      during the pass, simultaneously sense light intensities from all of the plurality of linear arrays,
      for each of the plurality of linear arrays, process the light intensities, sensed by that linear array during the pass, to generate an image of a portion of the specimen in the image plane in which that linear array is positioned, and
      align the images of the portion of the specimen in the plurality of image planes into a contiguous volume image of the portion of the specimen.

2. The digital scanning apparatus of claim 1, wherein the number of the plurality of linear arrays is greater than one thousand.

3. The digital scanning apparatus of claim 1, wherein a depth of field of the plurality of linear arrays is in a range of 10 microns to 1,000 microns.

4. The digital scanning apparatus of claim 1, wherein each of the plurality of linear arrays comprises a color linear array.

5. The digital scanning apparatus of claim 1, wherein each of the plurality of linear arrays comprises a time delay integration (TDI) linear array.

6. A digital scanning apparatus comprising:
a motorized stage configured to support a specimen and move the specimen at a substantially constant velocity;
an illumination system configured to illuminate a field of view;
imaging optics defining an optical path that optically couples the illuminated field of view to a camera;
the camera comprising a plurality of linear arrays, wherein each of the plurality of linear arrays comprises a plurality of light-responsive elements, wherein the camera is tilted with respect to the optical path, such that each of the plurality of linear arrays is positioned in a different one of a plurality of image planes, with respect to the optical path, than any of the other plurality of linear arrays, and wherein a depth of field of each of the plurality of linear arrays substantially abuts a depth of field of each of the plurality of linear arrays that are adjacent to that linear array; and
at least one processor configured to, for each of one or more passes of the motorized stage under the imaging optics at the substantially constant velocity,
during the pass, simultaneously sense light intensities from all of the plurality of linear arrays,
for each of the plurality of linear arrays, process the light intensities, sensed by that linear array during the pass, to generate an image of a portion of the specimen in the image plane in which that linear array is positioned, and
align the images of the portion of the specimen in the plurality of image planes into a contiguous volume image of the portion of the specimen.

7. A digital scanning apparatus comprising:
a motorized stage configured to support a specimen and move the specimen at a substantially constant velocity;
an illumination system configured to illuminate a field of view;
imaging optics defining an optical path that optically couples the illuminated field of view to a camera;
the camera comprising a plurality of linear arrays, wherein each of the plurality of linear arrays comprises a plurality of light-responsive elements, wherein the camera is tilted with respect to the optical path, such that each of the plurality of linear arrays is positioned in a different one of a plurality of image planes, with respect to the optical path, than any of the other plurality of linear arrays, and wherein a depth of field of each of the plurality of linear arrays overlaps a depth of field of each of the plurality of linear arrays that are adjacent to that linear array; and
at least one processor configured to, for each of one or more passes of the motorized stage under the imaging optics at the substantially constant velocity,
during the pass, simultaneously sense light intensities from all of the plurality of linear arrays,
for each of the plurality of linear arrays, process the light intensities, sensed by that linear array during the pass, to generate an image of a portion of the specimen in the image plane in which that linear array is positioned, and
align the images of the portion of the specimen in the plurality of image planes into a contiguous volume image of the portion of the specimen.

8. A digital scanning apparatus comprising:
a motorized stage configured to support a specimen and move the specimen at a substantially constant velocity;
an illumination system configured to illuminate a field of view;
imaging optics defining an optical path that optically couples the illuminated field of view to a camera;
the camera comprising a plurality of linear arrays, wherein each of the plurality of linear arrays comprises a plurality of light-responsive elements, wherein the camera is tilted with respect to the optical path, such that each of the plurality of linear arrays is positioned in a different one of a plurality of image planes, with respect to the optical path, than any of the other plurality of linear arrays, and wherein a depth of field of each of the plurality of linear arrays is spaced apart from a depth of field of each of the plurality of linear arrays that are adjacent to that linear array by a fixed amount; and
at least one processor configured to, for each of one or more passes of the motorized stage under the imaging optics at the substantially constant velocity,
during the pass, simultaneously sense light intensities from all of the plurality of linear arrays,
for each of the plurality of linear arrays, process the light intensities, sensed by that linear array during the pass, to generate an image of a portion of the specimen in the image plane in which that linear array is positioned, and
align the images of the portion of the specimen in the plurality of image planes into a contiguous volume image of the portion of the specimen.

9. A digital scanning apparatus comprising:
a motorized stage configured to support a specimen and move the specimen at a substantially constant velocity;
an illumination system configured to illuminate a field of view;
imaging optics defining an optical path that optically couples the illuminated field of view to a camera;
the camera comprising a plurality of linear arrays, wherein each of the plurality of linear arrays comprises a plurality of light-responsive elements, wherein the camera is tilted with respect to the optical path, such that each of the plurality of linear arrays is positioned in a different one of a plurality of image planes, with respect to the optical path, than any of the other plurality of linear arrays, and wherein a depth of field of the plurality of linear arrays encompasses an entire thickness of the specimen; and
at least one processor configured to, for each of one or more passes of the motorized stage under the imaging optics at the substantially constant velocity,
during the pass, simultaneously sense light intensities from all of the plurality of linear arrays,
for each of the plurality of linear arrays, process the light intensities, sensed by that linear array during the pass, to generate an image of a portion of the specimen in the image plane in which that linear array is positioned, and
align the images of the portion of the specimen in the plurality of image planes into a contiguous volume image of the portion of the specimen.

10. A digital scanning apparatus comprising:
a motorized stage configured to support a specimen and move the specimen at a substantially constant velocity;
an illumination system configured to illuminate a field of view;
imaging optics defining an optical path that optically couples the illuminated field of view to a camera;
the camera comprising a plurality of linear arrays, wherein each of the plurality of linear arrays comprises a plurality of light-responsive elements, wherein the camera is tilted with respect to the optical path, such that each of the plurality of linear arrays is positioned in a different one of a plurality of image planes, with respect to the optical path, than any of the other plurality of linear arrays, wherein each of the plurality of linear arrays comprises a color time delay integration (TDI) linear array; and
at least one processor configured to, for each of one or more passes of the motorized stage under the imaging optics at the substantially constant velocity,
during the pass, simultaneously sense light intensities from all of the plurality of linear arrays,
for each of the plurality of linear arrays, process the light intensities, sensed by that linear array during the pass, to generate an image of a portion of the specimen in the image plane in which that linear array is positioned, and
align the images of the portion of the specimen in the plurality of image planes into a contiguous volume image of the portion of the specimen.

11. A method of digital scanning comprising:
by an illumination system in a digital scanning apparatus, illuminating a field of view that is optically coupled to a camera by an optical path defined by imaging optics, wherein the camera comprises a plurality of linear arrays, wherein each of the plurality of linear arrays comprises a plurality of light-responsive elements, and wherein the camera is tilted with respect to the optical path, such that each of the plurality of linear arrays is positioned in a different one of a plurality of image planes, with respect to the optical path, than any of the other plurality of linear arrays; and,
by at least one processor in the digital scanning apparatus, for each of one or more passes of a motorized stage, supporting a specimen, under the imaging optics at a substantially constant velocity,
during the pass, simultaneously sense light intensities from all of the plurality of linear arrays, to generate a plurality of lines of image data for each of the plurality of image planes, such that each line of image data in one of the plurality of image planes corresponds to a line of image data in each of the other plurality of image planes,
determine a contrast value for each of the plurality of lines of image data,
compare the contrast values within each set of corresponding lines of image data across the plurality of image planes to determine a highest-contrast line of image data for each set of corresponding lines of image data, wherein the highest-contrast line of image data has a highest contrast value within the respective set of corresponding lines of image data, and
combine the highest-contrast lines of image data from each set of corresponding lines of image data to generate an image of at least a portion of the specimen.

12. The method of claim 11, wherein, during each of the one or more passes, the imaging optics remain stationary so as to maintain a fixed distance between the imaging optics and the specimen.

13. The method of claim 1, further comprising, by the at least one processor, aligning a plurality of images of portions of the specimen into an image of the entire specimen.

14. A digital scanning apparatus comprising:
a motorized stage configured to support a specimen and move the specimen at a substantially constant velocity;
an illumination system configured to illuminate a field of view;
imaging optics defining an optical path that optically couples the illuminated field of view to a camera;
the camera comprising a plurality of linear arrays, wherein each of the plurality of linear arrays comprises a plurality of light-responsive elements, and wherein the camera is tilted with respect to the optical path, such that each of the plurality of linear arrays is positioned in a different one of a plurality of image planes, with respect to the optical path, than any of the other plurality of linear arrays; and
at least one processor configured to, for each of one or more passes of the motorized stage under the imaging optics at the substantially constant velocity,
during the pass, simultaneously sense light intensities from all of the plurality of linear arrays, to generate a plurality of lines of image data for each of the plurality of image planes, such that each line of image data in one of the plurality of image planes corresponds to a line of image data in each of the other plurality of image planes,
determine a contrast value for each of the plurality of lines of image data,
compare the contrast values within each set of corresponding lines of image data across the plurality of image planes to determine a highest-contrast line of image data for each set of corresponding lines of image data, wherein the highest-contrast line of image data has a highest contrast value within the respective set of corresponding lines of image data, and
combine the highest-contrast lines of image data from each set of corresponding lines of image data to generate an image of at least a portion of the specimen.

15. The digital scanning apparatus of claim 14, wherein a number of the plurality of linear arrays is greater than two.

16. The digital scanning apparatus of claim 15, wherein the number of the plurality of linear arrays is greater than ten.

17. The digital scanning apparatus of claim 16, wherein the number of the plurality of linear arrays is greater than one thousand.

18. The digital scanning apparatus of claim 14, wherein a depth of field of each of the plurality of linear arrays substantially abuts a depth of field of each of the plurality of linear arrays that are adjacent to that linear array.

19. The digital scanning apparatus of claim 14, wherein a depth of field of each of the plurality of linear arrays overlaps a depth of field of each of the plurality of linear arrays that are adjacent to that linear array.

20. The digital scanning apparatus of claim 14, wherein a depth of field of each of the plurality of linear arrays is spaced apart from a depth of field of each of the plurality of linear arrays that are adjacent to that linear array by a fixed amount.

21. The digital scanning apparatus of claim 14, wherein a depth of field of the plurality of linear arrays encompasses an entire thickness of the specimen.

22. The digital scanning apparatus of claim 14, wherein a depth of field of the plurality of linear arrays is in a range of 10 microns to 1,000 microns.

23. The digital scanning apparatus of claim 14, wherein each of the plurality of linear arrays comprises a color linear array.

24. The digital scanning apparatus of claim 14, wherein each of the plurality of linear arrays comprises a time delay integration (TDI) linear array.

25. The digital scanning apparatus of claim 24, wherein the TDI linear array comprises a color TDI linear array.

* * * * *